United States Patent [19]
Smith et al.

[11] 3,961,858

[45] June 8, 1976

[54] COMPOUND ANGLE CUTTING EDGE

[75] Inventors: Billy R. Smith; Francis Moses Smith, both of Warren, Mich.

[73] Assignee: B&M Die Co., Inc., Warren, Mich.

[22] Filed: June 11, 1975

[21] Appl. No.: 585,802

[52] U.S. Cl. .................................. 408/204; 83/835
[51] Int. Cl.$^2$ ........................................ B23B 51/04
[58] Field of Search ............... 83/835, 854; 408/204

[56] References Cited
UNITED STATES PATENTS

| | | | |
|---|---|---|---|
| 3,293,962 | 12/1966 | Gianaris | 93/58.4 UX |
| 3,383,969 | 5/1968 | Saunders | 76/107 C X |
| 3,855,892 | 12/1974 | DiLello et al. | 83/835 |

*Primary Examiner*—Frank T. Yost
*Attorney, Agent, or Firm*—Cullen, Settle, Sloman & Cantor

[57] ABSTRACT

A novel compound angle cutting edge configuration on a die rule, slitter blade, hollow punches, shearing blades, etc. provides cleaner cuts on stock material with less tonnage, improved cutting and cleaner cuts. The die rule cutting edge includes a plurality of side by side notches on only one side of the cutting edge defining a plurality of equally spaced piercing points. A primary cutting edge extends from each piercing point substantially to a next adjacent piercing point and forms a compound angle with an imaginary line through the tips of the piercing points of between about one and fifteen degrees. In use, the cutting edges are axially pressed through stock material to cut blanks of predetermined configuration. The cutting action consists of the piercing points penetrating the material and then the primary cutting edges slicing the stock material from one penetration point, substantially linearly and unidirectionally, to the next adjacent penetration point.

13 Claims, 13 Drawing Figures

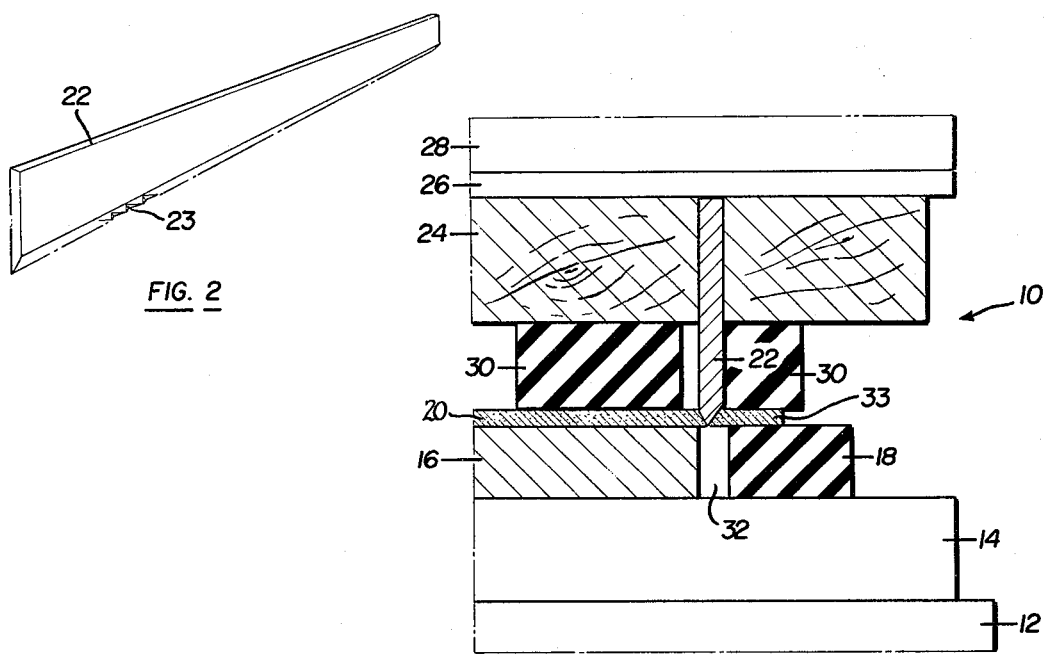
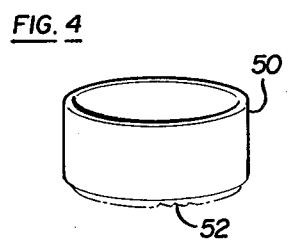
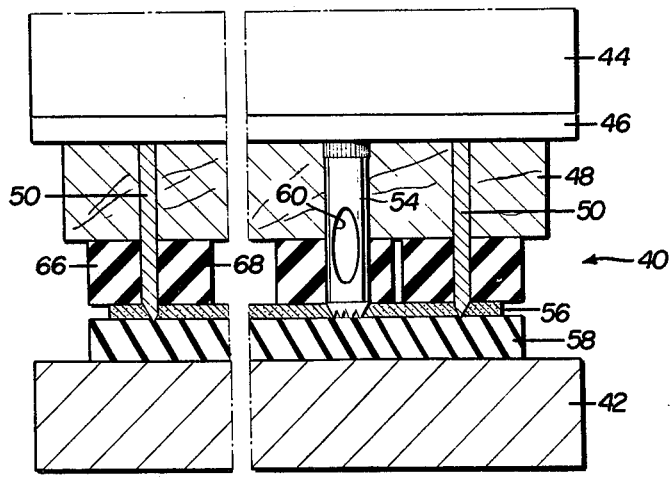
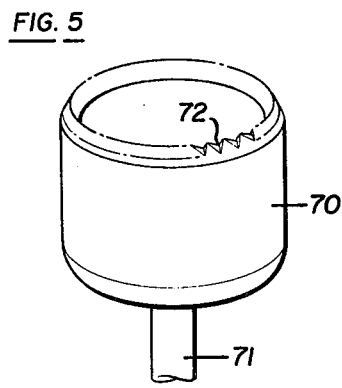

COMPOUND ANGLE CUTTING EDGE

CROSS REFERENCE TO RELATED APPLICATION

This application relates generally to subject matter which was disclosed and claimed in application Ser. No. 793,448, filed Jan. 23, 1969, and now abandoned.

BACKGROUND OF THE INVENTION

1. Field of the Invention

The present invention relates generally to various cutting tools such as die rule blades, slitter blades, hollow punches, etc. and more particularly to a novel cutting edge configuration.

2. The Prior Art.

Several unsolved problems have existed in the art of cutting devices prior to the present invention. For example, many cutting devices have somewhat elaborate cutting configurations which are costly to form on the cutting blade. Many other cutting blade arrangements simply do not give a clean cut on the stock material as desired.

Still other problems arise in connection with a cutting die press. For example, many of the prior art cutting blades require a relatively high tonnage or force to press the cutting blade entirely through the stock material. In die presses where a resilient die pad is used, inordinate wear of the die pad has been experienced with various types of notched blades because of the cutting blade cutting away the die pad after it has sliced through the stock material. If a hard metallic back up die pad is used, the cutting blade is dulled by metal-to-metal contact after the cutting operation.

Specific examples of prior art cutting blade configurations are disclosed in U.S. Pat. Nos. 3,277,764 to Henc, 3,422,712 to Lovas, and 201,104 to Frary. Each of these prior art devices likewise include inherent disadvantages not experienced by the present invention.

In short, the prior art does not provide the overall range of advantages or the structural arrangement or method of cutting edge disclosed herein.

SUMMARY OF THE INVENTION

The present invention relates specifically to an improved compound cutting edge configuration for die rule blades, slitter blades, hollow punches, shearing blades, etc. or similar cutting tools. This specific compound cutting edge configuration enables an improved method of cutting stock material.

The cutting edge configuration includes a plurality of side-by-side notches formed on a chamfered cutting edge portion, thereby forming a plurality of generally equally spaced piercing points or peaks. A primary cutting edge is defined which extends into the notch away from each peak and toward a next adjacent peak. The present invention contemplates that this primary cutting edge will extend substantially the entire distance between the two adjacent peaks, providing for a substantially unidirectional compound slicing or cutting action between the peaks. In a preferred embodiment, the cutting edge forms an angle with a line connecting the peaks of between about one and fifteen degrees. In the most preferred embodiment, this angle is between about one and five degrees. This relatively small angle forms a shallow notch valley between adjacent peaks, which substantially reduces the wear on a resilient backup die pad that may be used in combination with the present cutting blade configuration.

It has been found that this novel compound cutting blade configuration of the present invention reduces the pressure required for cutting stock material. This is somewhat surprising since it would be expected that larger angles would reduce the rate of cutting and therefore result in less resistance of the stock material to cutting.

In a preferred embodiment of the invention, each notch is formed individually by placing the cutting tool against a grinding edge. This forms major and minor compound angle pyramidal-shaped notch faces. The major notch face includes the primary cutting edge and the minor notch face forms a secondary cutting edge which interconnects the primary edge with the next adjacent piercing point.

The method of using the novel compound cutting edge of the present invention includes first placing stock material in alignment with the cutting tool, which is then moved under pressure toward the stock material. First contact between the cutting tool and the stock material is by the cutting edge piercing points which penetrate the material and initiate the cutting action. This initial penetration or piercing contributes to the overall reduction in pressure required for cutting by the present invention, as will be appreciated by those in the art. The continued movement of the compound cutting tool through the stock material results in the primary cutting edges slicing the stock material substantially unidirectionally from one piercing point to the next adjacent piercing point. A minimal amount of cutting is accomplished by the secondary cutting edge which interconnects the primary cutting edge with the next adjacent piercing point. Axial movement of the cutting tool is continued until the stock material is completely cut into the desired configuration.

One preferred application of the present cutting edge configuration is on a cutting die rule that is used in combination with a resilient back up die pad underneath the stock material. In this arrangement, the piercing points and cutting edges must extend completely through the stock material and into the die pad for a depth which is at least equal to the depth of the notch valley between the piercing points. Since the present invention enables a relatively shallow notch valley depth, the penetration into the die pad is reduced, resulting in increased die pad life.

This novel cutting configuration can be used in a wide variety of applications including die rule blades, shearing blades, slitter blades, hollow punches, rotary hole saws, etc. Additionally, the present invention may be used quite satisfactorily to cut a wide range of materials, including for example, fiberglass, fabrics, foam rubber, paper, surgical pads, sheet material including vinyl fibers, aluminum, plastics, and various and numerous types of textile goods. This extreme wide-range utility of the present invention can therefore be appreciated.

Many advantages have also been found to follow from the present invention. First, less tonnage or pressure is required to press the cutting tool through the stock material. This enables smaller power means with an associated reduction in cost. Additionally, the lower tonnage requirement results in longer life of the cutting tool, increased production, less maintenance and machine down time is obtained, since reduced pressure is developed at the cutting edge.

Another advantage is the cleaner, straighter cuts that are accomplished by the present invention. Additionally, the notched compound cutting edge configuration is relatively simple to form and can be done, for example, by grinding. As previously discussed, another advantage afforded by the present invention is longevity of the back up cutting die pad.

Other advantages are particular to the individual stock material being cut. For example, in cutting fiber glass it has been found that approximately eighty percent less dust is generated during cutting. Fibers in vinyl and other fiber materials are not fused together, because of less heat generated during the cutting action, resulting from cleaner cutting while the reduced pressure is exerted on the cutting tool.

Cutting cylindrical holes in foam with prior art cutting instruments generally results in a concave-shaped cut along the thickness of the stock material. This is due to the cutting instrument compressing the foam material before the cutting action actually begins. The present invention eliminates the concave or convex holes or end cuts and provides a straighter cut for foam materials because the piercing points initiate the cutting action and reduces the foam compression.

Other advantages and meritorious features of this invention will more fully appear from the following specifications, claims and accompanying drawings.

BRIEF DESCRIPTION OF THE DRAWINGS

FIG. 1 is a schematic, cross-sectional view of a die press which includes a cutting tool having the cutting edge configuration of the present invention;

FIG. 2 is a perspective view of the cutting tool of FIG. 1;

FIG. 3 is a schematic, partially cross-sectional view of another die press and cutting tool in combination with a punch tool;

FIG. 4 is a perspective view of the cutting tool in FIG. 3;

FIGS. 5–10 are perspective views of various cutting tools which may include the cutting configuration of the present invention;

DETAILED DESCRIPTION OF THE INVENTION

Figure 6:
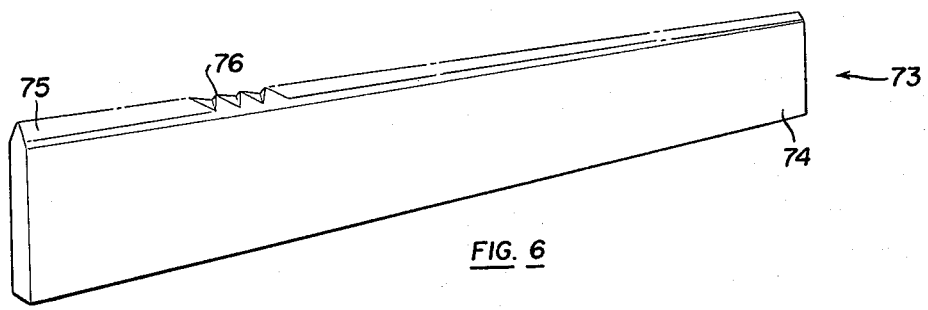

Referring now to the drawings, FIG. 1 illustrates a cutting press 10 which is primarily suited for use in cutting thick or tough materials, such as soft metallic materials. The die press 10 includes a fixed die base 12 surmounted by and connected to mounting plate 14 in a conventional manner. A male punch 16 and a resilient stripper pad 18 is suitably mounted on top of mounting plate 14 for receiving stock material 20. The stock material is cut with a flat die rule 22 which is shown in perspective in FIG. 2. The cutting edge of die rule 22 includes a plurality of side-by-side notched configurations 23 which form a novel cutting edge that will be more fully explained below.

Die rule 22 is mounted in a die rule mounting block 24, which is illustrated as being a wood block. Mounting block 24 is suitably mounted to a back up plate 26 which is connected to a punch holder 28. A compressible stripper pad 30 is also attached to mounting block 24 in conventional manner and comprises, for example, hard rubber as is somewhat conventional in the art. The die rule 22, stripper pad 30, mounting block 24, back up plate 26, and punch holder 28 comprise a vertically reciprocal cutting die.

Operation of the embodiment of FIG. 1 includes raising the cutting die so that a piece of stock material 20 may be properly positioned on male punch 16 and stripper pad 18. The cutter die is then driven under pressure downwardly so that the die blade 22 severs the stock material to form a blank of predesired configuration, thereby leaving scrap material 33. As illustrated, die rule blade 22 cuts through the stock material and barely extends into a slot 32 defined between punch 16 and stripper pad 18. Downward movement of the die press is limited substantially to the position shown in FIG. 1, so that the cutting edge on rule 23 does not strike mounting plate 14. As the die rule blade 22 projects into slot 32, the stripper pad 30 is compressed. Then as the die press is raised, stripper pad 30 expands and leaves the cut stock material on punch 16.

FIG. 3 illustrates a die press primarily suited for cutting soft stock material. This embodiment includes a fixed base 42 and a vertically reciprocable punch holder 44 to which back up plate 46, mounting block 48, and die rule blade 50 are mounted. In this particular embodiment, the die rule blade is cylindrical as shown in FIG. 4 and includes a plurality of side-by-side notches 52 in accordance with the present invention. Also in this embodiment, a punch 54 is suitably mounted in mounting block 48, and may include the cutting edge configuration of this invention.

In operation of the embodiment in FIG. 3, the punch holder 44 is raised from the position illustrated and a piece of stock material 56 is properly positioned on a resilient die pad 58. Die pad 58 is suitably mounted on the fixed base 42 and is comprised of a rubber or polyurethane material. Scrap material is formed during the cutting operation by punch 54, the scrap being removed through a knock-out hole 60 in punch 54, as is conventional.

After the stock material is properly positioned on the die pad, punch 54 is moved under pressure by suitable power means, such as a hydraulic cylinder and piston, to drive the die rule cutting blade through the stock material 56. At about the same time, punch 54 forms a scrap slug.

As shown in FIG. 3, the die rule cutting edge barely cuts into the die pad. This is necessary so that the notched configuration of the cutting edge in the present invention will completely cut through the stock material. However, in later portions of this disclosure, it will be explained that the present invention limits the extent to which the die rule cuts into the die pad, thereby yielding one of the advantages of the present invention; i.e., greater die pad longevity, with very little resurfacing required.

From the embodiments shown in FIGS. 1 and 3, it can be readily seen that the cutting edge configuration of this invention can be used in a variety of ways. FIGS. 5–10 further illustrate that the cutting edge configuration is not limited to a die rule, per se, but is virtually unlimited in its application. For example, FIG. 5 illustrates a circular hole saw 70 having a shaft 71 and being conventional in every respect except the novel cutting edge configuration 72 of the present invention.

FIG. 6 illustrates a flat die rule blade similar to that of FIG. 2 and including a shank 74. A chamfer 75 at the cutting edge of the die rule is formed by two converging, generally V-shaped surfaces. The novel cutting edge configuration of this invention is formed on the chamfer 75 and includes the plurality of notches and side-by-side peaks 76.

Figure 7:
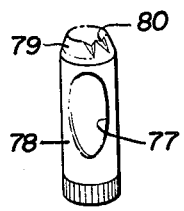
Figure 8:
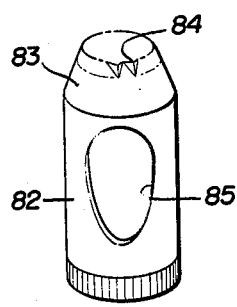

FIGS. 7 and 8 illustrate cylindrical die rules, or punches, 78 and 82 having respective chamfer regions 79 and 83. In these embodiments, the internal bore of the die rule is generally cylindrical, but there still exists two converging surfaces to define the cutting edge. Notches 80 and 84 are formed on the terminus of the cylindrical die rules to define the cutting edge configuration of this invention. Each punch includes a knockout hole 77 and 85, respectively, for scrap material ejection.

Figure 9:
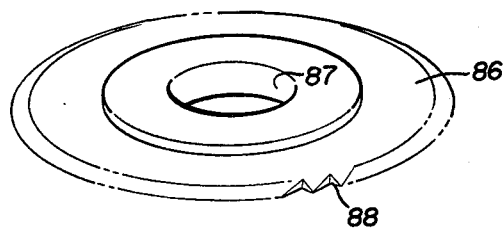

FIG. 9 illustrates a slitter wheel 86 including a circular hole 87 and being conventional in every respect except for the cutting edge configuration 88 of the present invention. As is known to those who are skilled in the cutting art, a slitter wheel traverses stock material under pressure to effect the cutting operation.

Figure 10:
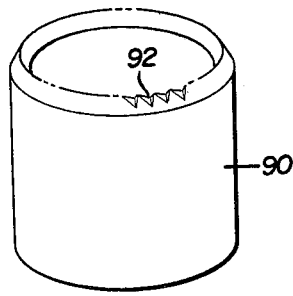

FIG. 10 illustrates another version of a cylindrical die rule 90 which is substantially similar to die rule 50 illustrated in FIG. 4. Of course, the cutting edge configuration 92 is that of the present invention.

Figure 11:
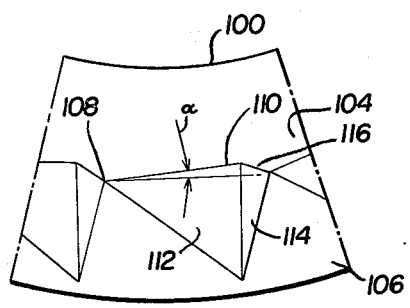
FIG. 11 is an enlarged, fragmented plan view of one embodiment of the cutting edge configuration.
Figure 12:
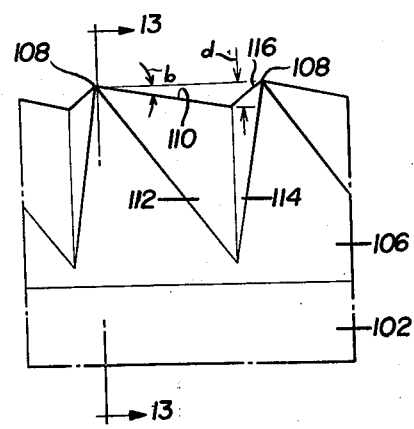
FIG. 12 is an enlarged, fragmented side elevational view of the cutting edge configuration of FIG. 11.
Figure 13:
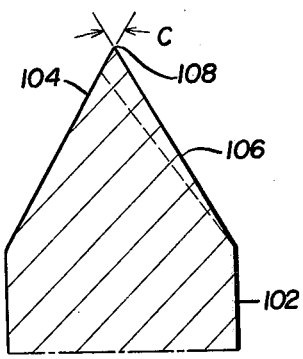
FIG. 13 is a cross-sectional view taken along plane 13—13 of FIG. 12.

For a complete description of the cutting edge configuration, reference is now made to FIGS. 11-13, which shows in enlarged fashion, the present invention. From FIG. 11, it can be seen that the illustrated tool is a cylindrical die rule 100, similar to that in FIG. 10. The die rule 100 includes a shank 102 and a chamfer formed by converging surfaces 104 and 106. FIG. 13 shows the converging sides forming an angle C, which in preferred embodiment, should be chosen to fall in the range of between one and thirty degrees. As discussed previously in regard to FIGS. 7 and 8, surface 104 could be cylindrical, but there would still exist two converging surfaces to define the die rule cutting region.

In accordance with the present invention, the cutting edge configuration includes side-by-side notches or indentations which are formed on only one of the chamfer converging surfaces, for example, by grinding. These notches define a plurality of generally equally spaced peaks 108 which serve to pierce the stock material to initiate the cutting action. The notches are also configured to form a plurality of primary cutting or slicing edges 110, each extending away from one peak into an associated notch and toward a next adjacent peak. It can be seen from FIG. 12, that cutting blade edge 110 extends approximately 75 to 80 percent or more of the distance between two adjacent peaks. For purposes of defining the present invention, it is considered that this constitutes the primary cutting edge extending substantially across the entire distance between two adjacent peaks.

Further, it can be seen from FIG. 12 that the primary cutting edge 110 forms an angle $b$ with a line through piercing points 108. According to the invention, this angle should be no more than about fifteen degrees. More preferably, the angle should be within the range of between about one and five degrees.

FIG. 11 also shows that cutting edge 110 forms an angle $a$ in plan view with a line through peaks 108. This angle is directly related, in general, to the slope angle of surface 104 relative to the vertical. This relationship can be seen in FIG. 13, wherein the notch is illustrated in phantom. In most instances, this angle $a$ will be between about one and fifteen degrees, but this is not critical. In die rule embodiments having a cylindrical inner bore, such as in FIGS. 7 and 8, angle $a$ would appear to approach zero for strict geometrical reasons.

The notched configuration of the present invention also defines a pair of pyramidal notch surfaces 112 and 114 and an incidentally-occurring secondary cutting edge 116. The secondary cutting edge, of course, cuts only small portions of the stock material so that the cutting action is substantially unidirectionally along primary cutting edge 110 from one piercing point to the next. In some embodiments, edge 116 may even become purely vertical so that the entire cutting action is along a primary cutting edge 110. For definitional purposes, surfaces 110 and 116 are considered to constitute a checkmarked shaped edge interconnecting adjacent piercing points.

Pyramidal-shaped surface 112, the major pyramidal surface, is bounded on one side by primary cutting edge 110 and has a common side with secondary pyramidal surface 114. For definitional purposes, these surfaces are considered to define a generally boomerang-shaped notch configuration. However, it is not necessary that the notches be defined by these pyramidal surfaces. The important consideration would appear to be the combination of the piercing points, the major cutting edges establishing progressive angular cutting from one piercing point to the next, and the notches being formed on only one side of the chamfer.

FIG. 12 also illustrates that the small angle $b$ defines a relatively shallow valley depth $d$. This depth will, of course, be a direct result of the angle $b$ and the distance between adjacent piercing points. For most applications of the present invention, this depth will not be more than about three sixteenths (3/16) of an inch. In the more preferred embodiments, the depth of the valley will be no more than about 3/32, and may even be as shallow as 1/32 and 1/64 of an inch, depending upon the material to be cut. In the most preferred embodiment, the valley depth will result from angle 6 being between about 1° and 5°. It will be recalled from the discussion relating to the embodiment of FIG. 3 that this shallow valley depth has great significance when a resilient back up die pad supports the stock material. Specifically, for a notched die rule blade to completely cut through stock material the cutting edge portion must project completely through the stock material and therefore into the resilient die pad material. This penetration depth is minimized in the present invention because of the shallow notch valley depth. Accordingly, the resilient die pad does not experience the wear associated with prior art notched cutting edges.

The manner of using a cutting tool having the present cutting edge configuration is substantially identical to that of prior cutting tools. However, the cutting action created by the present invention is not the same as in the prior art. Specifically, when the cutting tool is pressed into the stock material peaks 108 pierce the material to initiate the cutting action. Continued movement of the cutting tool through the stock material results in a progressive cutting or slicing by the primary cutting edge substantially unidirectionally from one piercing point to the next. Further, the piercing points and primary cutting edges are formed by a notch which is only on one side of the cutting tool so that stock material exerts a resistive pressure substantially on only one side of the cutting tool which creates a unidirectional cutting pressure on the material being cut. These overall structural limitations and cutting method steps result in the reduced tonnage requirements previously explained.

It is to be understood that the description and explanation herein is merely exemplary of the overall invention and is not intended to be limiting in any respect. For example, the cutting edge configuration may be formed by other methods than grinding and may be used in all equivalent cutting tools.

Having completely and thoroughly described our invention, we now claim:

1. A cutting tool having a shank terminating in a cutting portion which includes two converging surfaces forming a convergent angle of between one and thirty degrees, wherein the improvement comprises a plurality of side-by-side notches formed in one of the converging surfaces of said cutting portion, said notches defining (a) a series of generally equally spaced sharp piercing points and (b) a primary cutting edge extending away from each piercing point toward the next adjacent piercing point, each primary cutting edge extending substantially the entire distance between two adjacent piercing points and defining an angle in side elevation of the cutting tool with a line through the piercing points of between one and fifteen degrees, and each primary cutting edge defining an angle in plan view of the cutting tool with a line through two adjacent piercing points of between about zero and 15°.

2. The cutting tool as defined in claim 1, characterized by the angle defined in side elevation being between about only one and 5°.

3. The cutting tool as defined in claim 2, characterized by the angle defined in plan view being between about one and 15°.

4. The cutting tool as defined in claim 3, wherein the cutting tool comprises a continuous cutting portion.

5. The cutting tool as defined in claim 4, wherein the cutting tool consists of a cylindrical-shaped rotary hole saw.

6. The cutting tool defined in claim 4, wherein the cutting tool consists of a circular-shaped rotary slitter wheel.

7. The cutting tool defined in claim 4, wherein the cutting tool consists of a cylindrical-shaped die rule.

8. The cutting tool defined in claim 3, wherein the cutting tool consists of a flat, axial rule blade.

9. A die rule having two converging surfaces forming a cutting portion, wherein the improvement comprises a plurality of side-by-side generally boomerang-shaped indentations formed in one of said converging surfaces defining (a) a plurality of generally equally shaped piercing points, and (b) a substantially linear cutting edge extending from each piercing point toward a next adjacent piercing point, each of the cutting edges extending substantiallly the entire distance between said two piercing points, and in side elevation of the die rule said cutting edge forming an angle with a line through two piercing points of between about one and five degrees, said cutting edges thereby forming a generally check-shaped valley between each of said piercing points, the maximum depth of said valleys being about three-sixteenths of an inch.

10. The die rule as defined in claim 9, wherein the depth of said valleys is approximately one thirty-secondth of an inch.

11. In a cutting press including a resilient die pad aligned with an axially reciprocal die rule, the improvement of said die rule having a cutting surface defined by (a) a plurality of generally equally spaced piercing points and (b) a plurality of cutting edges between said piercing points, each of said cutting edges extending from a piercing point toward a next adjacent piercing point for substantially the entire distance between the two said piercing points, said cutting edges extending in a direction away from the die pad at an angle with a line through the tips of the piercing points of between about only one and fifteen degrees, thereby forming a generally check-marked shaped cutting surface valley between each of said piercing points, said valley having a depth of not more than three sixteenths of an inch, and said die rule piercing points thereby having to penetrate into said resilient die pad for a distance equal only to the depth of the cutting surface valley for the die rule to completely cut through the thickness of the material being cut.

12. The combination as defined in claim 11, wherein the angle between the cutting edge and the line through the tips of the piercing points is between one and five degrees and the depth of the piercing valley is approximately one sixty-fourth of an inch.

13. An improved die rule having a plurality of generally equally spaced piercing points and primary cutting edges on a chamfered cutting portion, each of said cutting edges being substantially linear and extending from one piercing point substantially the entire distance to next adjacent piercing point, each cutting edge and a line through the tips of the piercing points defining an acute angle between about one and five degrees, said piercing points and cutting edges being defined by notches formed in the die rule chamfer, said notches being defined by major and minor triangular-shaped notch faces between each piercing point, said major triangular face being bounded on one edge by a primary cutting edge, said notch faces having a common side, and the minor triangular face defining a secondary edge interconnecting the primary cutting edge with a next adjacent piercing point, said primary cutting edge and secondary edge defining a generally check-marked shaped edge configuration between each pair of adjacent piercing points.

* * * * *